United States Patent
Walker et al.

(10) Patent No.: US 6,757,118 B1
(45) Date of Patent: Jun. 29, 2004

(54) APPARATUS AND METHOD FOR WIGGLE RECOVERY IN A DISC DRIVE HAVING AN EMBEDDED SERVO

(75) Inventors: Timothy Ted Walker, Edmond, OK (US); Matthew Chad Burton, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/488,123

(22) Filed: Jan. 20, 2000

Related U.S. Application Data (60) Provisional application No. 60/126,336, filed on Mar. 26, 1999.

(51) Int. Cl.[7] ............................................... G11B 27/36
(52) U.S. Cl. .............................. 360/31; 360/53; 360/63; 360/68
(58) Field of Search .............................. 360/31, 53, 46, 360/63, 67, 68, 75, 77.02, 317, 318, 77.08, 60

(56) References Cited

U.S. PATENT DOCUMENTS

| | | | |
|---|---|---|---|
| 5,189,566 A | * | 2/1993 | Christensen et al. .......... 360/53 |
| 5,208,715 A | | 5/1993 | Mowry |
| 5,337,200 A | | 8/1994 | Watanabe |
| 5,721,816 A | | 2/1998 | Kusbel et al. |

* cited by examiner

Primary Examiner—Alan Faber
(74) Attorney, Agent, or Firm—Merchant & Gould P.C.

(57) ABSTRACT

A programmable controller and method for correcting operation of a read/write head in a disc drive having an embedded servo system in which the head is not reading correctly operates by applying a write current to the failed head only after the head is positioned over an area of a disc that does not have useful data thereon. Movement and position of the head that is not reading correctly is determined from a signal from an adjacent head. The adjacent head is used to read servo information. After the adjacent head has provided servo information and the controller repositions the adjacent head in a safe area, a write current is applied to the failed head to realign the head without the potential of adversely impacting data stored in adjacent tracks.

17 Claims, 4 Drawing Sheets

| READ ERROR RECOVERY TABLE ||
|---|---|
| TABLE COUNT | CORRECTIVE OPERATION |
| 1 | SEEK AWAY |
| 2 | REREAD DATA |
| 3 | REREAD DATA |
| 4 | ADAPT READ CHANNEL |
| 5 | CHANGE ECC LEVEL |
| 6 | CHANGE ECC LEVEL |
| 7 | CHANGE ECC LEVEL |
| 8 | CHANGE ECC LEVEL |
| 9 | +6% OFF TRACK CENTER |
| 10 | +6% OFF TRACK CENTER |
| 11 | -6% OFF TRACK CENTER |
| 12 | -6% OFF TRACK CENTER |
| 13 | +12% OFF TRACK CENTER |
| 14 | +12% OFF TRACK CENTER |
| 15 | -12% OFF TRACK CENTER |
| 16 | -12% OFF TRACK CENTER |
| 17 | WIGGLE RETRY |

APPARATUS AND METHOD FOR WIGGLE RECOVERY IN A DISC DRIVE HAVING AN EMBEDDED SERVO

RELATED APPLICATIONS

This application claims the benefit of provisional application Ser. No. 60/126,336 entitled "Wiggle Recovery on an Embedded Servo Hard Drive" filed on Mar. 26, 1999.

FIELD OF THE INVENTION

The invention is directed to a programmable disc drive actuator controller and method for correcting a first transducer or head that is not reading correctly by applying a write current thereto, and, more particularly, to a programmable controller and method that uses a different transducer to determine the position of the incorrectly reading transducer before a write current is applied to the first transducer so that useful data is not overwritten by the first transducer.

BACKGROUND OF THE INVENTION

Modern hard disc drives include one or more rigid discs that are coated with a magnetizable medium and mounted on the hub of a spindle motor for rotation at a constant high speed. Information is stored on the discs in a plurality of concentric circular tracks by an array of transducers or heads mounted for movement to an electronically controlled rotary actuator assembly.

The heads are mounted via flexures at the ends of a plurality of arms which project radially outward from a substantially cylindrical actuator body. The actuator body is journaled by ball bearing assemblies to rotate about a pivot shaft which is mounted to the disc drive housing at a position closely adjacent to the outer extreme of the discs. The pivot shaft is parallel with the axis of rotation of the spindle motor and the discs and the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the magnets and causes the coil to move in accordance with the well-known Lorentz relationship. As the coil moves relative to the magnets, the actuator body pivots about the pivot shaft and the heads are moved across the disc surfaces.

Typically, the heads are supported over the discs by slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by a read channel circuit of the disc drive. For a detailed discussion of disc drive reading and writing techniques, see U.S. Pat. No. 5,276,662 entitled DISC DRIVE WITH IMPROVED DATA TRANSFER APPARATUS, issued Jan. 4, 1994 to Shaver et al., assigned to the assignee of the present invention.

When uncorrectable read errors are detected, the disc drive may reread the data and, if the read error persists, the disc drive may attempt other corrective operations, such as seeking away, which involves moving the head away from, and then back to, the selected track and rereading the data, or modifying the channel parameters used by the read channel and rereading the data. Disc drives are commonly provided with a defined error recovery procedure in the event of read errors so that a predefined sequence of corrective operations is employed upon occurrence of such errors.

Magnetoresistive heads display certain magnetic domain instabilities that render the head unable to adequately read. Not only does this cause data read type errors but the head is also unable to recover servo information under this condition. The inability to recover servo information prevents the servo system from staying on track when the failing head is selected.

A write operation is often useful in bringing a head out of this condition. Passing a write current through the head tends to re-randomize the magnetic domains and allow the head to read. However, for embedded servo type drives, the failing head cannot be used to track follow. A write current or "dummy write," whose only purpose is to pass write currents through the head to stabilize the head must be done in an area where no useful data is stored.

In older, dedicated servo products, such an operation was trivial. In an embedded servo drive, however, the inability to read causes an inability to servo so the drive cannot track follow on the failing head in order to complete the dummy write. Thus, it is UNSAFE to apply write current to the failed head since its location is not known and therefore useful data may be overwritten. Thus, it is desirable to provide a method of correcting a head that is not reading adequately while preventing useful data from being overwritten.

SUMMARY OF THE INVENTION

Against this backdrop the present invention has been developed. A first aspect of the invention is a disc drive that includes a wiggle retry program for correcting a head in a disc drive system that is unable to read correctly. The head is corrected by applying a write current to the head. The drive includes a first head for reading data stored on a disc and means coupled to the head for determining the position of the first head when it fails to read correctly and applying the write current to the first head after the first head's position is determined.

According to a second aspect of the invention, there is provided a method of correcting a head in a disc drive that is unable to read correctly. The method includes the steps of (a) switching to a second head when a first head fails to read, (b) receiving servo information from the second head, and (c) applying a write current to the first head when the servo information received from the second head indicates that the first head is in a safe area on a disc.

According to a third aspect of the invention, there is provided a computer-readable medium having computer executable instructions for performing the steps of the method according to the second aspect of the invention.

These and various other features as well as advantages which characterize the present invention will be apparent from a reading of the following detailed description and a review of the associated drawings.

DETAILED DESCRIPTION OF THE INVENTION

The present invention is directed to a method and program control for correcting a head that fails to read adequately by using a different head to supply servo information to the servo controller for track following while applying a write current to the failed head so that the position of the failed head is known and useful data is not overwritten.

Figure 1:
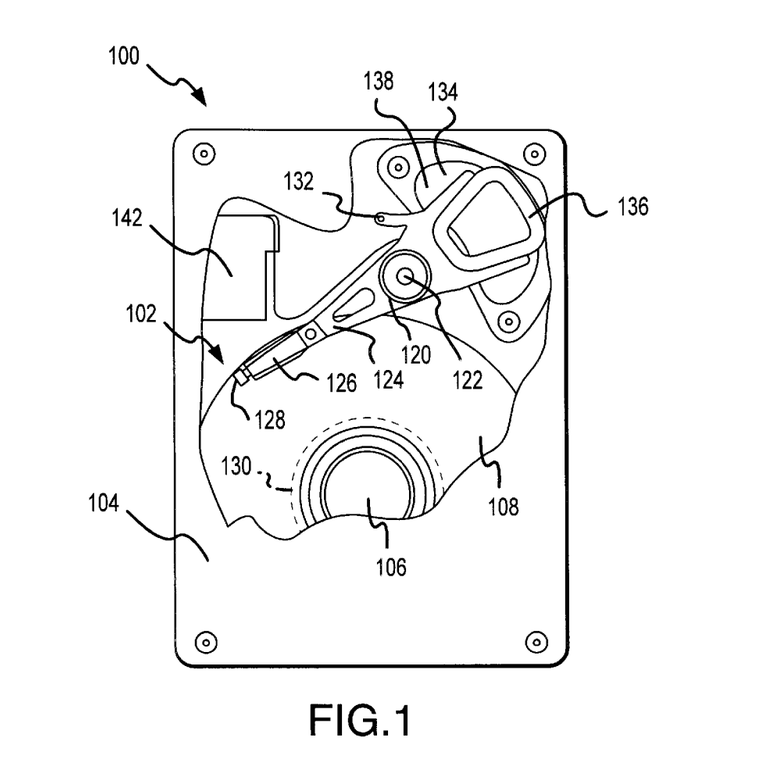
FIG. 1 is a top plan view of a disc drive incorporating a preferred embodiment of the present invention.

FIG. 1 shows a top plan view of a disc drive 100 in which the present invention is particularly useful. The disc drive 100 includes a generally rectangular base 102 to which various disc drive components are mounted. A top cover 104, shown in a partial cut-away fashion to expose selected components of interest, is fastened to the base 102 to seal the disc drive 100 from intrusion of moisture and other undesirable contaminants. It will be readily understood that the base 102 includes an interior surface to which various disc drive components are mounted, as well as side walls which, in combination with the top cover 104, provide sufficient height to house these components.

Mounted to the base 102 is a spindle motor (not shown) having a rotatable spindle hub 106 to which a plurality of discs 108 are mounted for rotation at a constant high speed. Adjacent the discs 108 is an actuator assembly 120 (also referred to as an "E-block") which pivots about a pivot shaft 122 in a rotary fashion. The actuator assembly 120 includes actuator arms 124 which support gimbal assemblies 126. Each of the gimbal assemblies 126 in turn supports a head 128, with each of the heads 128 corresponding to one surface of one of the discs 108. The heads 128 are positioned over data tracks (not shown) each located on one of the surfaces of the discs 108 in order to read data from and write data to the tracks. At such time that the disc drive 100 is not in use, the heads 128 are moved to landing zones (denoted at broken line 130), which are located in FIG. 1 near the inner diameter of the discs 108. Alternatively the landing zones may be located at the outer diameter of the discs or any other desirable location on the disc. However, an inner diameter landing zone is typical and thus illustrated.

The actuator assembly 120 is controllably positioned by way of a voice coil motor (VCM) shown generally at 134 which includes an actuator coil 136 immersed in the magnetic field generated by a permanent magnet 138. It will be recognized that a magnetically permeable flux path (such as a steel plate) is mounted above the actuator coil 136 to complete the magnetic circuit of the VCM 134, but for purposes of illustration this flux path has not been shown in FIG. 1. When controlled DC current is passed through the actuator coil 136, an electromagnetic field is set up which interacts with the magnetic circuit of the VCM 134 to cause the actuator coil 136 to move relative to the permanent magnet 138. As the actuator coil 136 moves, the actuator assembly 120 pivots about the pivot shaft 122, causing the heads 128 to move across the surfaces of the discs 108.

Head wires (not separately shown) are routed on the actuator assembly 120 from the heads 128, along the gimbal assembles 126 and the actuator arms 124, to a flex circuit assembly 140 to provide the requisite electrical conduction paths between the heads 128 and disc drive read/write circuitry (not shown in FIG. 1). The head wires are secured by way of a suitable soldering process to corresponding pads (not separately designated in FIG. 1) of the flex circuit assembly 140. In turn, the flex circuit assembly 140 is connected to a flex circuit bracket (shown generally at 142) in a conventional manner and communication is provided between the flex circuit bracket 142 and a printed circuit board (PCB) (not shown) mounted to the underside of the disc drive 100. As will be recognized, the PCB houses the interface and servo control electronics for the disc drive 100.

Figure 2:
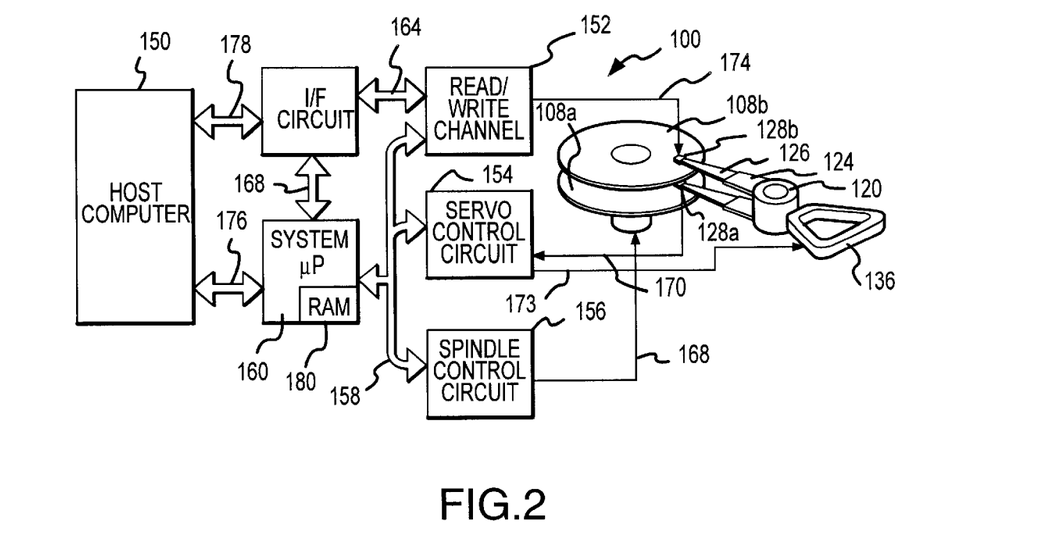
FIG. 2 is a functional block diagram of the servo control system for the disc drive of FIG. 1.

Referring now to FIG. 2, a simplified functional block diagram of the disc drive 100 of FIG. 1 is shown, operably coupled to a host computer 150. More particularly, the disc drive 100 generally includes a read/write channel 152, a servo control circuit 154 and a spindle control circuit 156, all operably coupled preferably by way of control bus 158 to a system microprocessor 160. It will be recognized that the control bus 158 includes the necessary connections for the system microprocessor 160 to communicate with and control the disc drive circuits. Additionally, an interface circuit 162 is shown connected to the read/write channel 152 (by way of an internal data bus 164) and to the system microprocessor 160 (by way of a control bus 166), with the interface circuit 162 serving as a data interface for the disc drive 100.

The spindle motor control circuit 156 controls the rotational speed of the spindle hub 106 and discs 108A, 108B, as generally indicated by signal path 168. As the construction and operation of spindle control circuit 156 are conventional, these will not be further discussed here. It will also be appreciated that while only two discs and heads are shown, a disc drive typically includes more than two and information may be stored on one surface of each disc or on both upper and lower surfaces. Thus the present invention is not limited to the particular illustration. The embodiment illustrated is exemplary only.

It will be recognized that in an embedded servo system as in the present invention, each of the heads 128A, 128B serve as both servo and data heads, with both servo information and data being stored on the tracks on the discs 108A, 108B. In an embedded servo system, functional connections would generally be provided from each of the heads 128A, 128B to the servo control circuit 154 as well as to the read/write channel 152. However, it will be recognized that the present invention does not depend on the use of a particular type of servo system. The present invention may be used in either a sector servo or a dedicated servo system scheme. For more discussion regarding the construction and operation of a typical dedicated servo control circuit, see U.S. Pat. No. 5,262,907 entitled HARD DISC DRIVE WITH IMPROVED SERVO SYSTEM, issued Nov. 16, 1993, assigned to the assignee of the present invention.

Finally, the read/write channel 152 passes data to be written to and read from the disc 108B, respectively, by way of signal path 174 and head 128B. In response to a write command received by the system microprocessor 160 from the host computer 150 (by way of a command bus 176), the system microprocessor 160 controls the flow of data to be written to disc from the host computer 150 to the interface circuit 162 (by way of an external data bus 178) and from the interface circuit 162 to the read/write channel 152 (by way of the internal data bus 164). The read/write channel 152, in turn, provides a write current to the head 128B by way of the path signal 174 in order to write the data by selectively magnetizing selected data tracks on the disc 108B.

Likewise, in response to a read command from the host computer 150, the head 128B detects flux transitions from the selected data tracks on the disc 108B and provides an analog read signal to the read/write channel 152, which in turn converts the analog read signal to digital form and performs the necessary decoding operations to provide data to the interface circuit 162 for output to the host computer 150. In controlling these various operations of the disc drive 100, the system microprocessor 160 includes the use of programming stored in system microprocessor memory, RAM 180.

Figure 3:
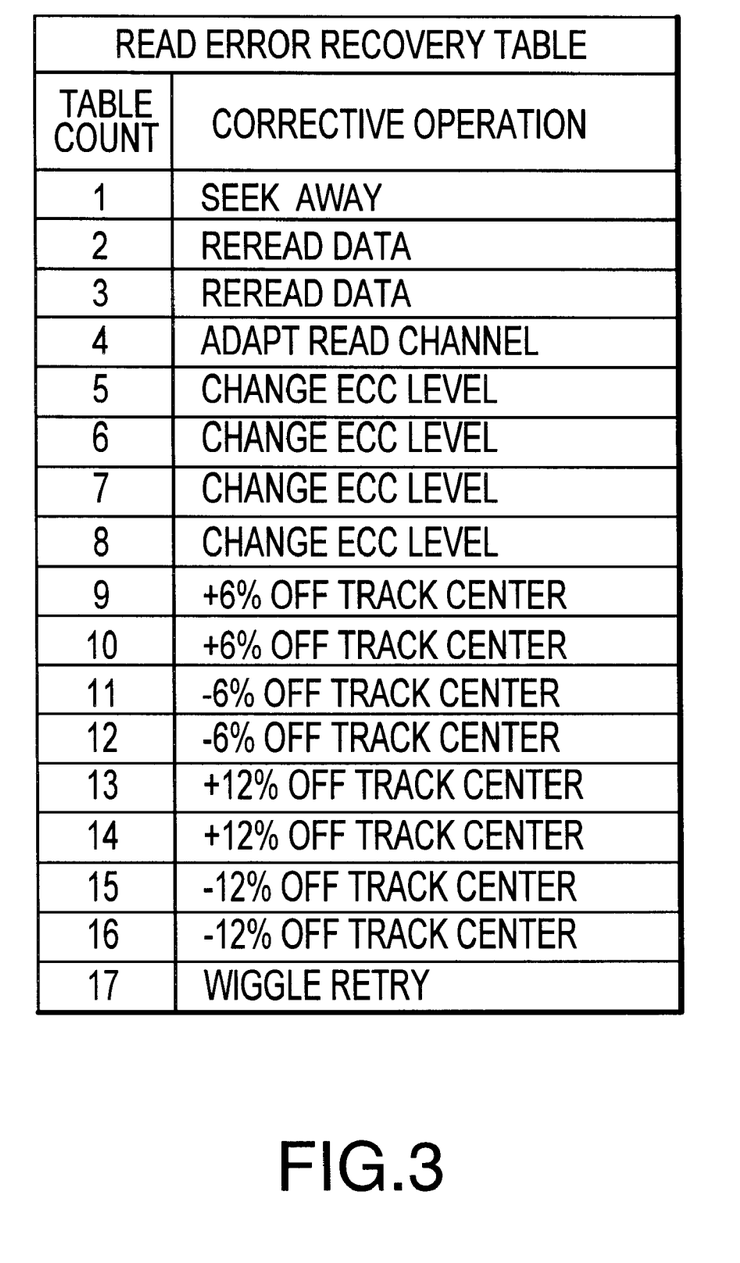
FIG. 3 is a generalized flow chart of recovery steps performed by a disc drive in accordance with the preferred embodiment of the present invention.

FIG. 3 provides a generalized flow chart in tabular form of the recovery steps performed by the disc drive 100 in which the present invention finds utility. Generally, disc drives are programmed to perform a read error recovery routine, which represents a routine stored in the form of programming in the RAM 180 and used by the system microprocessor 160 when uncorrected read errors are detected by the read/write channel 152.

As an overview, the read error recovery routine generally operates in response to an uncorrected read error by first providing a series of "free retries" where the data containing the uncorrected read error is reread a number of times. Should the free retries result in the correction of the read error, the disc drive 100 continues normal operation and the routine ends.

However, when the free retries do not result in the correction of the read error, the routine advances to a read error recovery table, containing a sequentially ordered set of corrective operations. Each of the corrective operations are performed in order, until either the read error is resolved or the subroutines listed in the table of FIG. 3 are exhausted. Should the table be exhausted without correction of the error, the disc drive 100 preferably sets a hard error flag, notifies the host computer 150 of the error condition and takes other suitable action, such as marking the sector containing the uncorrectable error as a "bad sector". On the other hand, should a corrective operation from the table correct the error, the subroutines in the table are reordered so that the corrective operation which corrected the error is advanced one location in the table. In this manner, the table is continually updated and adapted to the performance of the drive, thus optimizing the operation of the drive and minimizing the time required to correct read errors. For example, assuming that the count 5 subroutine "change ECC Level" corrected an error. Upon error correction, count 5 would be moved to the position of count 4, thus placing the "change ECC Level" earlier in the recovery table. In this manner, subsequent corrective operations may be updated and optimized. For a detailed discussion of the read recovery error table see U.S. Pat. No. 5,721,816 assigned to the assignee of the present invention.

Note that in the recovery table of FIG. 3, the last action is identified as "WIGGLE RETRY". This subroutine, in accordance with the present invention, involves repositioning the failed head, for example, head 128B, over a non-data, user track which is preferably located at an inner or an outer diameter of the disc 108B and outside of the band of tracks normally used to record data. The WIGGLE RETRY routine applies a write current to the failed head while it is over this non-data, user track. The WIGGLE RETRY subroutine corrects read errors that occur as a result of domain instability in a head as discussed above.

Figure 4:
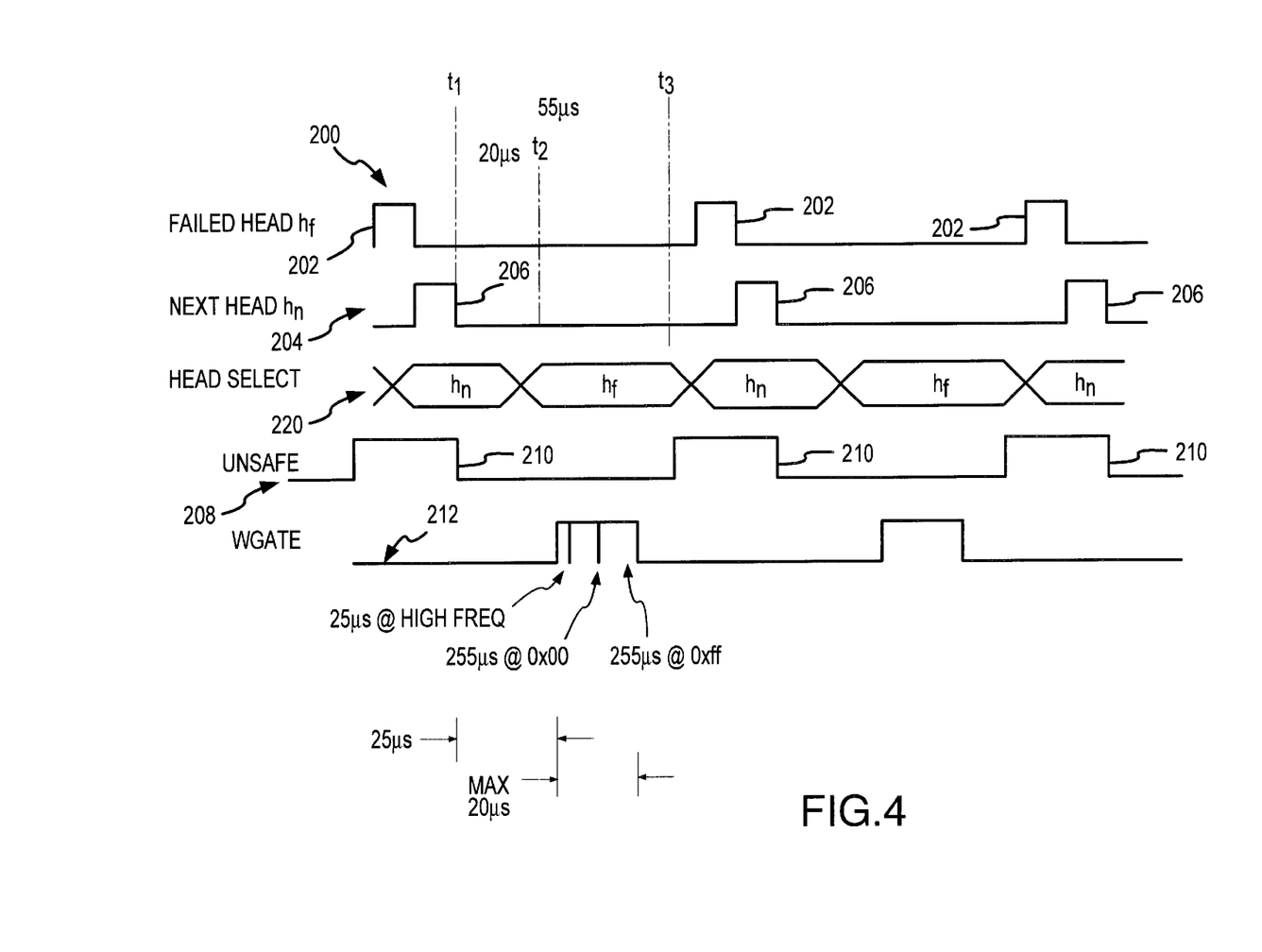
FIG. 4 is a timing diagram of the read and write signals in accordance with the preferred embodiment of the present invention.

More particularly, the wiggle recovery routine 300 according to a preferred embodiment of the invention is set forth in FIG. 5 and will be described with reference to the signal graphs of FIG. 4. The graphs of FIG. 4 include a series of signals plotted against time. It is to be understood that the graphs of FIG. 4 are not drawn to scale but rather are drawn for illustrative purposes. The top graph of FIG. 4 is a plot of a signal 200 generated by a head which, for discussion purposes, is assumed to fail. The failed head signal 200 includes a train of pulses 202 with each pulse indicating when the head passes over servo information on a disc. Below signal 200 for the failed head is a signal 204 of the next adjacent head or next head. Each pulse 206 in the next head graph 204 indicates when that head passes over servo information. The servo information for each head is preferably offset in time from the heads adjacent thereto as shown. The fourth signal 208 in FIG. 4 is an UNSAFE signal. The UNSAFE signal 208 includes a train of pulses 210 that indicate when it is UNSAFE to apply a write current to the failed head because the failed head is not in a safe location and thus data may be inadvertently be overwritten. The UNSAFE signal 208 is high (210) when it is UNSAFE to apply write current to the failed head and is low when it is safe to apply write current. The high pulse 210 of the UNSAFE signal 208 is timed to overlap the servo pulses of both the failed head and next head signals 200 and 204 respectively. The servo control asserts the UNSAFE signal to prevent overwriting either servo sample should the disc sequencer timing be inaccurate.

As previously described, the write current needs to be applied to the failed head when the failed head is in a region where no user or system data is written. Since the servo does not recover servo data from the failed head, the wriggle recovery routine 300 in accordance with the present invention ensures that the failed head is in fact over an unused track region so that needed data is not overwritten. This is accomplished by using the servo system's head offset table, set forth in Table 1 below, which is constantly updated during normal drive operation. During every normal head switch, the servo control system records the head-to-head direct current (DC) offset. When the wiggle retry recovery routine 300 is called, the servo firmware compares the offset between the failed head and the next head. If this offset exceeds a predetermined safe value, the recovery routine is aborted.

The third signal from the top illustrated in FIG. 4 is a head select signal 220 which illustrates the state of the preamplifier as to which head, either $h_f$ or $h_n$ is selected. As can be seen from the head select signal 220, the selection of heads between the failed head and the next head switches back and forth preferably every data wedge. The position of the failed head is determined by reading servo information with an adjacent head since all heads are vertically aligned. When the next head ($h_n$) is selected, servo information for track following is read from that head to locate the position of the failed head ($h_f$). After obtaining this servo information and track following is verified, the failed head ($h_f$) is then selected and a write current signal 212, WGATE, is applied to the failed head as shown by the fifth signal of FIG. 4. The write current is thus applied to the failed head when the failed head is located at a safe predetermined track location where it will not overwrite useful data. Preferably, the switch from the next head to the failed head $h_f$ occurs about 20 $\mu$seconds after the next head reads its servo information and the switch back to the next head occurs about 55 $\mu$seconds after the next head reads its servo information.

In a preferred embodiment, the write current 212 is applied for a duration of about 20 $\mu$seconds. The write current preferably has an initial high frequency signal of about 25 bytes at a high frequency of about 112 megahertz for this model of disc drive. This is followed by 255 bytes of direct current in one direction followed by 255 bytes of direct current in another direction, opposite to the first direction. The preferred characteristics of the write current are empirically derived.

It can be seen from the signals of FIG. 4 that the position of the next head is checked before and after every application of the write current to the failed head. Thus, while the drive is track following on the next head the preamp register is directed to switch to the failing head for a short duration and then back to the next head in time to recover the next servo sample. During the period of time that the failing head is selected, the disc sequencer asserts WGATE to place the preamp in write mode and send a suitable data pattern to restore the reader to its normal state.

Thus, if a head induces too many errors such that the servo cannot track follow, the present invention calls for seeking to a non-user area, preferably at the outer diameter of a disc, on a good head and writing a short pattern for a brief period on the failing head. This requires the servo to switch to the failed head directly after obtaining feedback on the good head, and then switching back to the good head just prior to getting feedback. In order to prevent overwriting the servo pattern on the failing head, it is desired to servo on a head whose servo pattern is exactly one skew tick ahead of the failing head. Therefore, for each failing head, there is only one head that should be use for feedback. It should also be noted that the UNSAFE pulse must be set prior to reaching the servo wedge of the failing head. This leaves approximately 25 $\mu$s for a pattern write per servo wedge Table 1 below describes which head should be used to gather servo information for each head that fails. Preferably, the head used for feedback should be on the same preamp as the failing head to minimize position offsets between heads and loop time. Switching from good head to a failed head continues for each servo wedge until a seek command is issued, at which point servo will terminate the wiggle mode and function normally.

TABLE 1

| FAILING HEAD: | GOOD (FEEDBACK) HEAD: |
|---|---|
| 0 | 9 |
| 1 | 8 |
| 2 | 0 |
| 3 | 1 |
| 4 | 2 |
| 5 | 3 |
| 6 | 4 |
| 7 | 5 |
| 8 | 6 |
| 9 | 7 |
| 10 | 19 |
| 11 | 18 |
| 12 | 10 |
| 13 | 11 |
| 14 | 12 |
| 15 | 13 |
| 16 | 14 |
| 17 | 15 |
| 18 | 16 |
| 19 | 17 |

Figure 5:
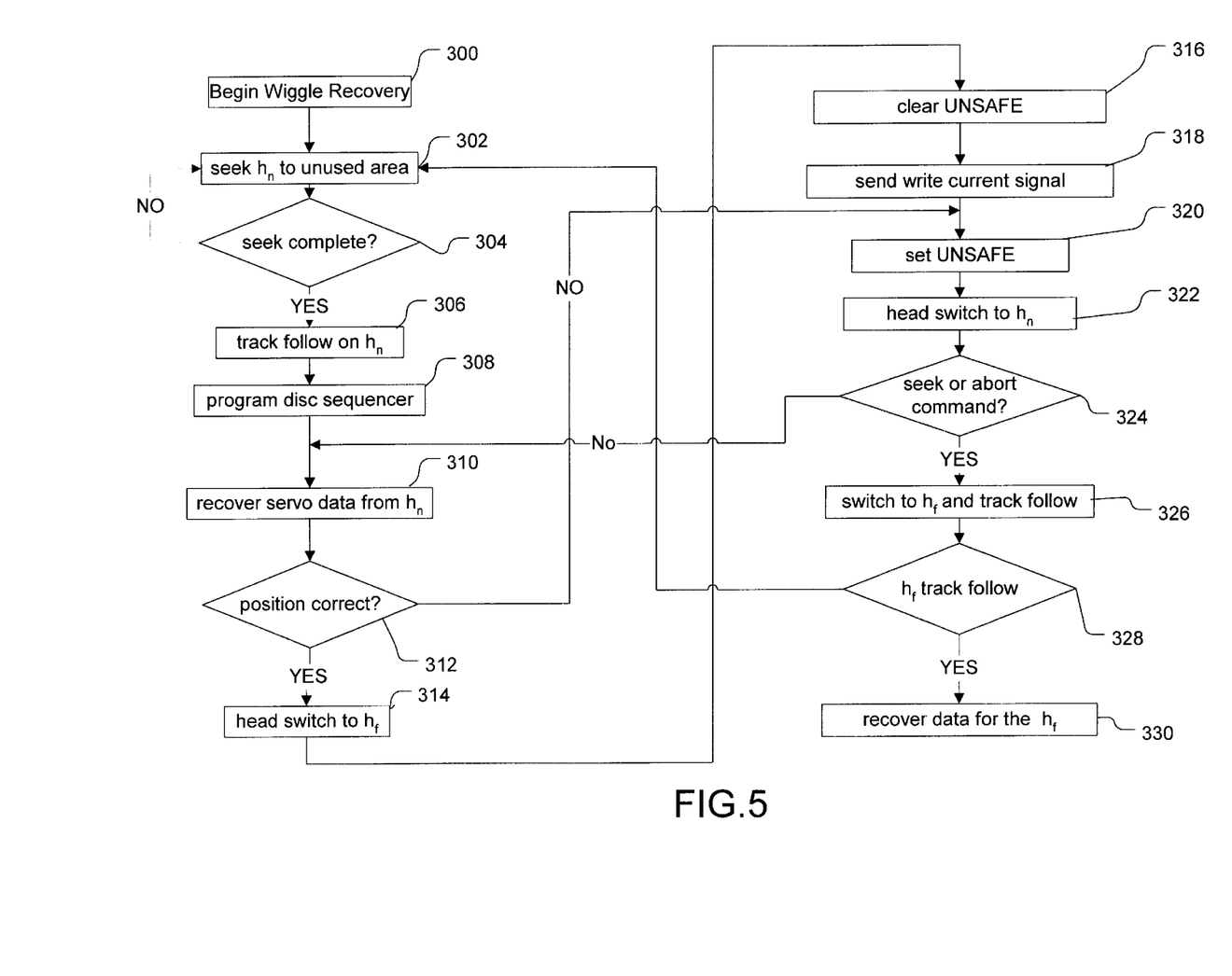
FIG. 5 is a flow diagram of the operations in the wiggle recovery process in accordance with the preferred embodiment of the present invention.

FIG. 5 illustrates an exemplary flow diagram of the operations in the wiggle recovery method or routine in accordance with a preferred embodiment of the present invention. Wiggle recovery begins in operation 300, where the servo control directs that the actuator assembly 120 be position over an used track. In particular, control transfers to operation 302, where the failed head ($h_n$) is identified and the head having the next time sequence ($h_n$) is identified and selected by the servo control. A seek command is then issued in operation 302 to position the actuator assembly 120 over a known unused track utilizing $h_n$. Control transfers to query operation 304 where the servo controller inquires whether the seek is complete. If the query operation 304 answer is no, control returns to operation 302 until the seek is complete. If the query operation 304 answer is yes, control transfers to operation 306 in which normal track following mode utilizing $h_n$ on the unused track is established.

When normal track following has been established utilizing $h_n$ in operation 306, control transfers to the program disc sequencer in operation 308. The program disc sequencer is programmed to provide the high frequency dc+ and dc− write current signal at the desired time, preferably starting at $t_2$, about 20 microseconds after the falling edge of $h_n$'s gate, as shown by the dashed vertical line $t_2$ in FIG. 4.

The next several operations 310 through 324 apply the wiggle head switch cycling sequence. Specifically, control transfers from operation 308 to operation 310 where the servo recovers servo information from $h_n$ to verify that the heads are positioned correctly. Control then transfers to query operation 312 in which the query is made whether the heads are positioned correctly over the designated unused track. If so, control transfers to operation 314, but only if the heads are positioned correctly. In operation 314, the servo switches heads to the failed head $h_f$. Control then transfers to operation 316 where the UNSAFE signal is cleared. Control then transfers to operation 318. In operation 318, the sequence of alternating dc+ and dc− write signals are applied to the failed head $h_f$ as described above during a period of about 35 microseconds, between $t_2$ and $t_3$. Control then transfers to operation 320 where the UNSAFE signal is set. Control then switches to $h_n$.

If, on the other hand, in operation 314, the heads are not positioned correctly, control transfers immediately to operation 320, bypassing the write sequence just described where the UNSAFE signal is set and then control transfers to operation 322 where the servo switches to the hn. Control then transfers to a query operation 324 which asks whether a seek or abort request is present from the disc controller. If not, control transfers back to operation 310 and the process repeats. If a data seek request or abort command is present, the drive controller programs the disc sequencer to stop sending the wiggle write control transfers out of the wiggle recovery routine. The drive controller then requests the servo to seek to $h_f$ in operation 326 and attempts to track follow. Control then may transfer to query operation 328. If the track following on $h_f$ is successful, in query operation 328, control transfers to operation 330 where the drive controller may recover data from the data area of the disc under the formerly failed head $h_f$. Alternatively, the drive controller may return to normal use of $h_f$.

In summary, the invention may be viewed as a disc drive (such as 100) which has a disc (such as 108) mounted on a drive motor (such as 106), an actuator assembly (such as 120) adjacent the disc (such as 108) carrying read/write heads (such as 128) for reading and writing data from and to the disc and a sector servo controller (such as 154) connected to the read/write heads (such as 128) in the actuator assembly (such as 120) for controlling the transfer of data to and from the disc. The controller (such as 154) includes a wiggle retry program (such as 300) for correcting a failing first read/write head (such as 128) that is unable to read data correctly by applying a write current to the failing head.

Stated another way, the drive has means coupled to the first head for determining the position of the first head when it fails to read correctly and applying the write current to the first head after the first head's position is determined. This means for determining comprises code (such as 300) stored in the controller of the disc drive that causes servo information obtained from the disc from a second head to be read to determine the position of the first head. This code provides for switching to a second head when the first head fails to read, seeking with the second head to an unused area of the disc (such as in operation 302), switching to the first head when the second head has reached the unused area of the disc (such as in operations 310 through 314), and applying the write current to the first head when the second head is in the unused area of the disc (such as in operation 318). Further, the code preferably includes switching from the first head to the second head and back again every data wedge (such as 220).

The code also preferably includes generating an UNSAFE command (such as 208 and 210 whenever the first or second head is located over servo information. The write current has an initial high frequency burst followed by a low frequency signal (such as 212). The high frequency burst preferably has a duration of about 25 bytes and the low frequency signal has a duration of about 510 bytes. The low frequency signal preferably has a polarity during a first half of the signal and a second polarity during a second half of the signal wherein the second polarity is opposite of the first polarity.

The present invention may also be viewed as a method of correcting operation of a first read/write head (such as 128) in a disc drive that is unable to read from the first read/write head correctly. The method preferably includes the steps of:

(a) switching operation to a second head (such as in operation 300) when the first head fails to read (such as 220);

(b) receiving servo information from the second head (such as 204); and (c) positioning the second head over a safe area on the disc (such as in operation 302);

(d) applying a write current to the first head when the servo information received from the second head indicates that the first head is in the safe area on the disc (such as in operation 318).

The step (d) of applying a write current preferably occurs when the servo information received from the second head indicates that the first head is located over an area where no useful data is written on the disc (such as in operations 302 through 316). The method further preferably includes a step (e) of switching to the first head after step (c) but before step (d) (such as in operations 308 through 312) and may include in the step (b) a step of generating an UNSAFE command (such as 210) whenever the first or second head is located over servo information (such as in operation 320). More preferably, the step c may also include seeking with the second head to an unused area of the disc before step (d).

The invention may alternatively be embodied in computer storage medium readable by a programmable controller (such as 154) and encoding a computer program of instructions (such as 300) for executing a process for correcting a disc drive read write head that is unable to read correctly. The process preferably includes the steps of:

(a) switching to a second head (such as 128) when a first head fails to read;

(b) seeking with the second head to an unused area of disc (such as in operations 302 through 304);

(c) switching to the first head when the second head has reached the unused area of disc (such as in operation 314); and (d) applying a write command to the first head when the second head is in the unused area of disc (such as in operation 318).

The medium preferably also includes the embodied step (e) of switching from the first head to the second head and back again every data wedge (such as 220) and the step of generating an UNSAFE command whenever the first or second head is located over servo information (such as 208 and 210 and in operation 320). The write command (such as 212) preferably has an initial high frequency burst followed by a low frequency signal.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive apparatus comprising:

a disc mounted on a drive motor, an actuator assembly adjacent the disc carrying read/write heads for reading and writing data from and to the disc and a sector servo controller connected to the read/write heads in the actuator assembly for controlling the transfer of data to and from the disc; and a wiggle retry program in the controller for correcting a failing first read/write head that is unable to read data correctly by applying a write current to the failing head, wherein the wiggle retry program includes code stored in the controller of the disc drive that causes servo information obtained from the disc from a second head to be read to determine the position of the first head.

2. The drive of claim 1 further comprising code for generating an UNSAFE command whenever the first or second head is located over servo information.

3. A disc drive apparatus comprising:

a disc mounted on a drive motor, an actuator assembly adjacent the disc carrying read/write heads for reading and writing data from and to the disc and a sector servo controller connected to the read/write heads in the actuator assembly for controlling the transfer of data to and from the disc;

a wiggle retry program in the controller for correcting a failing first read/write head that is unable to read data correctly by applying a write current to the failing head;

code in the program for switching to a second head when the first head fails to read;

code in the program for seeking with the second head to an unused area of the disc;

code in the program for switching to the first head when the second head has reached the unused area of the disc; and code in the program for applying the write Current to the first head when the second head is in the unused area of the disc.

4. The drive of claim 3 further comprising code in the program for switching from the first head to the second head and back again every data wedge.

5. A disc drive apparatus comprising:

a disc mounted on a drive motor, an actuator assembly adjacent the disc carrying read/write heads for reading and writing data from and to the disc and a sector servo controller connected to the read/write heads in the actuator assembly for controlling the transfer of data to and from the disc; and a wiggle retry program in the controller for correcting a failing first read/write head that is unable to read data correctly by applying a write current to the failing head, wherein the write current has an initial high frequency burst followed by a low frequency signal.

6. The drive of claim 5 wherein the high frequency burst has a duration of about 25 bytes and the low frequency signal has a duration of about 510 bytes.

7. The drive of claim 5 wherein the low frequency signal has a polarity during a first half of the signal and a second polarity during a second half of the signal wherein the second polarity is opposite of the first polarity.

8. A method of correcting operation of a first read/write head operably adjacent to a storage medium that is unable to read from the first read/write head correctly, the method comprising the steps of:

(a) switching operation to a second head when the first head fails to read;

(b) receiving servo information from the second head; and (c) positioning the second head over a safe area on the storage medium;

(d) applying a write current to the first head when the servo information received from the second head indicates that the first head is in the safe area on the storage medium.

9. The method of claim 8 wherein step (d) of applying a write current occurs when the servo information received from the second head indicates that the first head is located over an area where no useful data is written on the storage medium.

10. The method of claim 8 further comprising a step (e) of switching to the first head after step (c) but before step (d).

11. The method of claim 8 wherein the step (b) further comprises a step (b)(i) generating an UNSAFE command whenever the first or second head is located over servo information.

12. The method of claim 8 wherein step c further comprises a step (c)(i) of seeking with the second head to an unused area of the storage medium before step (d).

13. A computer storage medium readable by a programmable controller and encoding a computer program of instructions for executing a process for correcting a read write head that is unable to read correctly, the process comprising the steps of:

(a) switching to a second head when a first head fails to read;

(b) seeking with the second head to an unused area of the computer storage medium;

(c) switching to the first head when the second head has reached the unused area of the computer storage medium; and (d) applying a write command to the first head when the second head is in the unused area of the computer storage medium.

14. The medium of claim 13 further comprising the step:

switching from the first head to the second head and back again every data wedge.

15. The medium claim 14 further comprising the step of generating an UNSAFE command whenever the first or second head is located over servo information.

16. The medium of claim 13 wherein the write command has an initial high frequency burst follow by frequency signal.

17. The medium of claim 16 wherein the high frequency burst has a duration of about 25 bytes and the low frequency has a duration of about 510 bytes.

* * * * *